(12) United States Patent
Itoo et al.

(10) Patent No.: US 9,528,595 B2
(45) Date of Patent: Dec. 27, 2016

(54) V-BELT TYPE CONTINUOUSLY VARIABLE TRANSMISSION

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP); Jun Takagi, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 116 days.

(21) Appl. No.: 14/260,496

(22) Filed: Apr. 24, 2014

(65) Prior Publication Data

US 2015/0308560 A1 Oct. 29, 2015

(51) Int. Cl.
*F16H 57/04* (2010.01)
*F16H 57/027* (2012.01)
*F16H 57/031* (2012.01)
*B60K 11/08* (2006.01)

(52) U.S. Cl.
CPC .......... *F16H 57/0489* (2013.01); *B60K 11/08* (2013.01); *F16H 57/027* (2013.01); *F16H 57/031* (2013.01); *F16H 57/0416* (2013.01)

(58) Field of Classification Search
CPC .... F16H 57/031; F16H 57/0416; B60K 11/06; B60K 11/08
See application file for complete search history.

(56) References Cited

U.S. PATENT DOCUMENTS

| | | | | |
|---|---|---|---|---|
| 4,531,928 A * | 7/1985 | Ikenoya | ................... | B62M 9/06 180/229 |
| 7,281,603 B2 * | 10/2007 | Fukuda | ................... | F02B 61/02 180/357 |
| 7,427,248 B2 * | 9/2008 | Chonan | ................... | F16H 57/05 474/150 |
| 8,075,007 B2 * | 12/2011 | Brady | ..................... | B60B 3/142 280/124.111 |
| 8,382,620 B2 | 2/2013 | Morita | | |
| 8,556,015 B2 * | 10/2013 | Itoo | ........................ | B60K 11/08 180/68.1 |
| 8,827,020 B2 * | 9/2014 | Deckard | ................ | B60K 13/02 180/68.1 |
| 8,834,307 B2 * | 9/2014 | Itoo | ..................... | F16H 57/0416 474/93 |
| 9,140,340 B2 * | 9/2015 | Lai | ...................... | F16H 57/0416 |
| 9,182,031 B2 * | 11/2015 | Kouma | ................. | F16H 57/031 |
| 2006/0270503 A1 * | 11/2006 | Suzuki | ................ | F16H 57/0489 474/144 |

(Continued)

FOREIGN PATENT DOCUMENTS

JP 2010-151237 7/2010

*Primary Examiner* — Minh Truong
(74) *Attorney, Agent, or Firm* — Wenderoth, Lind & Ponack, L.L.P.

(57) ABSTRACT

A V-belt type continuously variable transmission is provided with a transmission case attached to an engine and forms an outer shape, comprising: an air intake duct provided with an air intake port arranged on an engine side; and an air intake duct connection port arranged in a side wall on the engine side of the transmission case and connected to the air intake duct, the air intake duct connection port being inclined relative to the side wall.

8 Claims, 9 Drawing Sheets

(56) References Cited

U.S. PATENT DOCUMENTS

| | | | |
|---|---|---|---|
| 2007/0219030 A1* | 9/2007 | Ho | F16H 57/035 474/144 |
| 2010/0167853 A1* | 7/2010 | Morita | F16H 9/18 474/13 |
| 2012/0031693 A1* | 2/2012 | Deckard | B60K 13/02 180/68.3 |
| 2012/0289370 A1* | 11/2012 | Yamanishi | B60K 11/08 474/93 |
| 2013/0087403 A1* | 4/2013 | Itoo | F16H 57/0416 180/339 |
| 2013/0090198 A1* | 4/2013 | Itoo | F16H 57/03 474/93 |

* cited by examiner

V-BELT TYPE CONTINUOUSLY VARIABLE TRANSMISSION

BACKGROUND OF THE INVENTION

1. Field of the Invention

The present invention relates to a V-belt type continuously variable transmission and, in particular, to a V-belt type continuously variable transmission in which cooling air is supplied in the inside.

2. Description of the Related Art

In a V-belt type continuously variable transmission, the inside of the transmission case is provided with: a drive pulley; a driven pulley; and a V-belt wound around between both pulleys. The transmission case is provided with an inlet opening and an outlet opening. Then, cooling air supplied through the inlet opening to the transmission case is guided from the drive pulley side to the driven pulley side and then discharged through the outlet opening. By virtue of this, the inside of the transmission case is cooled.

For example, Japanese Patent Publication No. 2010-151237 discloses a V-belt type continuously variable transmission in which an air intake port is provided in the outer periphery of a transmission case and a centrifugal fan is provided in the rear face of a sheave on the engine side of the drive pulley. The air intake port is arranged so as to be oriented approximately to the air inlet part in the inner side of the radial direction of the centrifugal fan, that is, arranged approximately in parallel to the shaft axis of the drive shaft. Then, the air inlet part is connected to an air intake duct for acquiring cooling air from the front. By virtue of this, cooling air is taken in from the front through the air intake duct and then supplied to the air inlet part of the centrifugal fan.

Meanwhile, when the cooling air is to be taken in from the side on the engine side of the V-belt type continuously variable transmission, the air intake duct need be arranged so as to bypass the engine from the side on the engine side and then extend to the air inlet part in the outer periphery of the transmission case. This causes the air intake duct to become longer.

On the other hand, when for the purpose of shortening the path of the air intake duct, an inlet opening is provided in the side surface on the engine side of the transmission case and then the air intake duct is connected to the inlet opening, with departing from the connection part with the engine, the inlet opening is arranged at a position deviated from the shaft axis of the drive shaft. As a result, the air intake passage from the inlet opening to the air inlet part of the centrifugal fan needs to be bent approximately at a right angle. This causes a rise in the pressure loss in the air intake passage and hence a decrease in the amount of cooling air supply.

SUMMARY OF THE INVENTION

The present invention has been made in view of the above-mentioned problem. An object thereof is to provide a V-belt type continuously variable transmission of a type in which the air intake passage is compactly constructed such that cooling air is supplied from the side surface on the engine side and a rise in the air intake pressure loss in the passage can be restrained.

In order to achieve the above-mentioned object, the present invention provides a V-belt type continuously variable transmission provided with a transmission case attached to an engine and forming an outer shape, comprising: an air intake duct provided with an air intake port arranged on the engine side; and an air intake duct connection port arranged in a side wall on the engine side of the transmission case and connected to the air intake duct, wherein the air intake duct connection port is inclined relative to the side wall.

According to the above-mentioned configuration, since the air intake duct connection port is provided in the side wall on the engine side of the transmission case, the air intake duct extending from the air intake port arranged on the engine side to the air intake duct connection port can be compactly arranged in a short distance. Further, since the air intake duct connection port is inclined, the air intake passage leading from the air intake duct to the transmission case can be connected in an inclined manner relative to the transmission case. This restrains arise in the air intake pressure loss in the connection part.

In the above-mentioned V-belt type continuously variable transmission, the following configurations may preferably be employed.

(1) The inside of the transmission case accommodates a transmission mechanism including: a drive shaft connected to the engine and provided with a drive pulley; a driven shaft provided with a driven pulley; and a V-belt wound around between the drive pulley and the driven pulley, the transmission case is provided with an inlet opening which is in fluid communication with the air intake duct connection port, and the air intake duct connection port is inclined and directed to a direction extending from the inlet opening to the drive shaft.

According to the above-mentioned configuration (1), the air intake passage in the air intake duct connection port can be connected at an obtuse angle to the air intake passage leading from the inlet opening to the drive shaft. Thus, the air intake passage leading from the air intake duct connection port to the transmission case can be constructed so as to be gradual. This restrains a rise in the air intake pressure loss in the connection part.

(2) The V-belt type continuously variable transmission is mounted on a vehicle, and the air intake duct connection port is inclined in a rearward direction of the vehicle.

According to the above-mentioned configuration (2), the present invention can preferably be implemented in a case in which the air intake duct is arranged so as to pass the rear part of the vehicle and extend to the air intake duct connection port, such as a case in which the air intake duct is arranged so as to bypass the engine in the rear from the air intake port on the engine side.

(3) The air intake duct extends from the air intake port through a bent part to the air intake duct connection port, and the air intake duct connection port is directed to the bent part.

According to the above-mentioned configuration (3), in the downstream of the bent part, the air intake duct can be connected to the air intake duct connection port in an approximately straight line alignment. Thus, the air intake passage leading from the air intake duct in the downstream of the bent part to the air intake duct connection port can be constructed in an approximately straight line alignment. This restrains a rise in the air intake pressure loss in the connection part. Further, when the air intake duct is arranged in an approximately straight line alignment, the air intake duct is constructed in a short distance. This permits size reduction in the air intake duct and improves the assembly workability.

(4) In addition to the above-mentioned configuration (1), a partition plate is provided for partitioning the transmission case into a transmission chamber for accommodating the transmission mechanism and into an air intake chamber extending from the inlet opening to the drive shaft, and the partition plate is made from resin.

According to the above-mentioned configuration (4), heat release from the transmission chamber to the air intake chamber is restrained by the partition plate made from resin having a low thermal conductivity. This restrains a temperature rise in the cooling air in the air intake chamber.

(5) In addition to the above-mentioned configuration (4), a region of the partition plate approximately opposite to the inlet opening is provided with an inlet-side recess recessed toward the transmission chamber side.

According to the above-mentioned configuration (5), the air intake passage opposite to the inlet opening, that is, the air intake passage in the connection part from the air intake duct connection port to the air intake chamber can be expanded. This restrains a rise in the air intake pressure loss in the connection part.

(6) In addition to the above-mentioned configuration (4), an exhaust passage is further provided for discharging cooling air that has passed through the transmission chamber, to the outside of the transmission case via an outlet opening provided in the transmission case, the exhaust passage defined as a region extending from the surroundings of the driven shaft to the outlet opening and located between an inner wall surface of the transmission case and the driven pulley, and a region of the inner wall surface opposite to the driven pulley is provided with an outlet-side recess recessed toward the outside of the transmission case.

According to the above-mentioned configuration (6), the exhaust passage can be expanded. In particular, even when the driven pulley constructed movably on the driven shaft is located close to the inner wall surface of the transmission case, excessive reduction of the exhaust passage by the driven pulley is restrained. This ensures a discharging property for the cooling air that has passed through the transmission chamber.

(7) In addition to the above-mentioned configuration (6), in the transmission case, an outlet-side rib for separating the exhaust passage and the transmission chamber from each other is provided so as to protrude toward the driven pulley.

According to the above-mentioned configuration (7), a situation in which the cooling air that has passed through the transmission chamber returns from the exhaust passage to the transmission chamber is restrained by the outlet-side rib. Thus, the cooling air that has passed through the transmission chamber can easily be guided to the outlet opening. This ensures a discharging property for the cooling air that has through the transmission chamber.

DETAILED DESCRIPTION OF THE INVENTION

An embodiment of the present invention is described below with reference to the accompanying drawings. Here, for simplicity of the following description, the forward and the backward directions of a utility vehicle are used also for referring to the forward and the backward directions of a V-belt type continuously variable transmission and other components. Further, in the vehicle width directions, the right and the left directions viewed from the passenger of the utility vehicle (that is, the right and the left in a situation in which the forward is viewed from the utility vehicle) are used also for referring to the right and the left directions of the V-belt type continuously variable transmission and other components.

Figure 1:
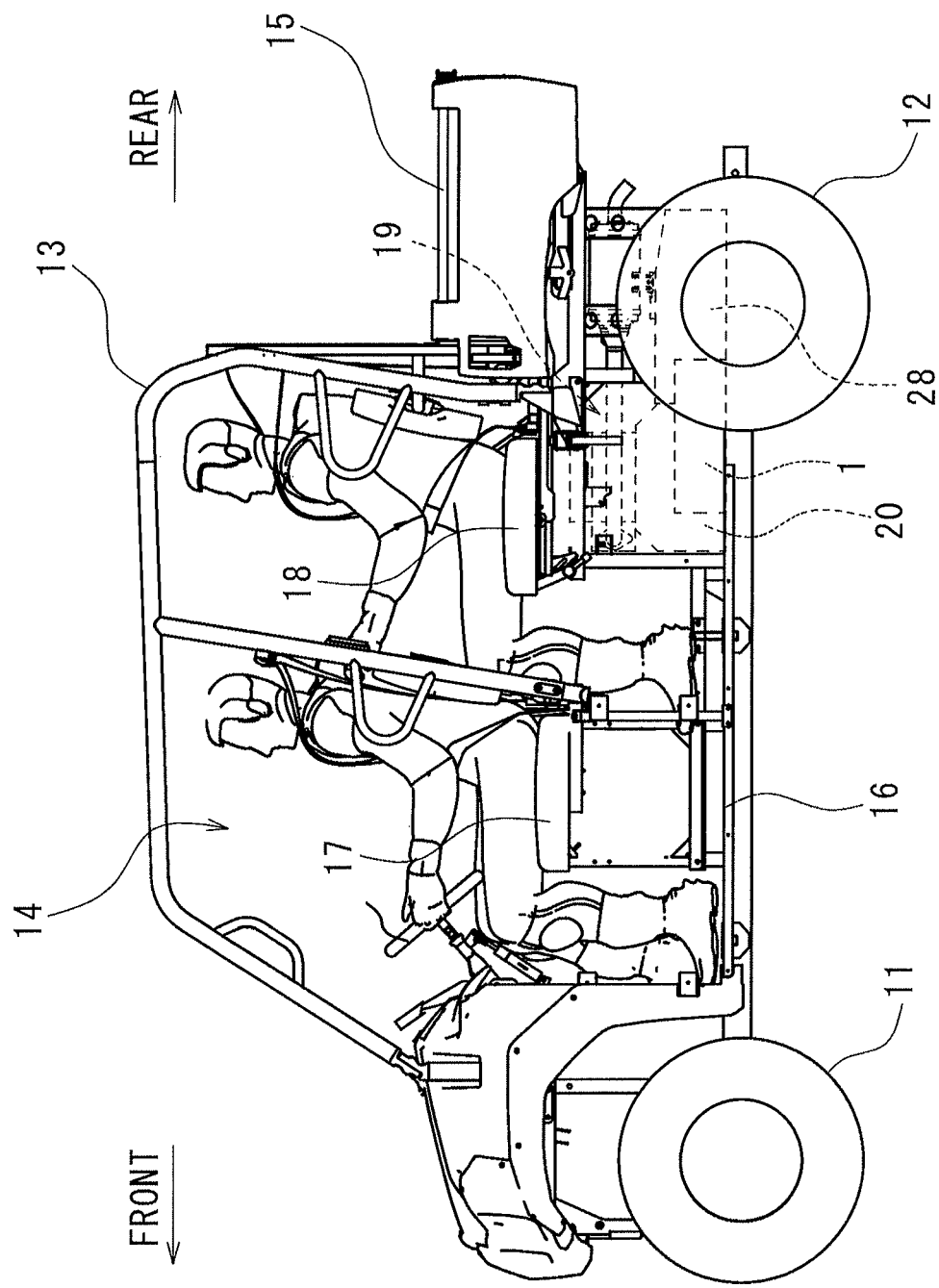
FIG. 1 is a left side view of a utility vehicle including a V-belt type continuously variable transmission according to an embodiment.

FIG. 1 is a left side view of a utility vehicle including a V-belt type continuously variable transmission according to the present embodiment, in a situation in which outer-shape forming members such as doors are removed. As shown in FIG. 1, the utility vehicle includes: a pair of right and left front wheels 11 located in a front part; and a pair of right and left rear wheels 12 located in a rear part. Then, a cabin space 14 surrounded by a ROPS 13 is provided between the front wheels 11 and the rear wheels 12, and a rear deck 15 is provided behind the cabin space 14. The ROPS 13 is an abbreviation of a rollover protective structure.

The inside of the cabin space 14 is provided with: a floor panel 16 that forms a floor; a front seat 17; and a rear seat 18. An engine room 19 is formed and extends from a part under the rear seat 18 to a part under the rear deck 15. An engine 20, a transmission device 28, and a V-belt type continuously variable transmission 1 are arranged in the engine room 19.

Figure 2:
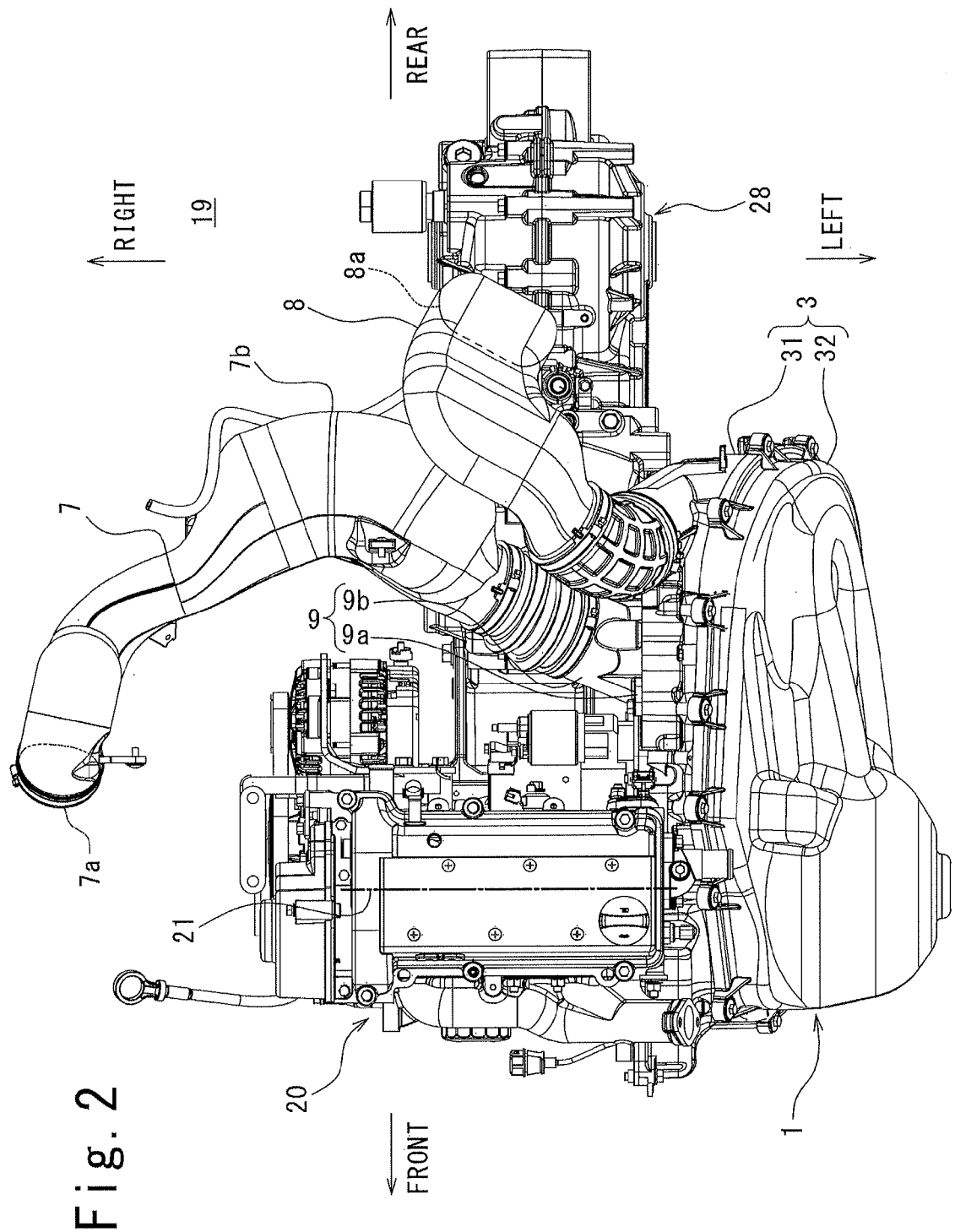
FIG. 2 is a top view of an engine room.

FIG. 2 is a top view of the engine room 19. The engine 20 is arranged in an orientation such that a crankshaft 21 thereof (a shaft axis thereof alone is shown) is directed to the vehicle width direction. The transmission device (a gear type transmission) 28 is arranged behind the engine 20. The V-belt type continuously variable transmission 1 is arranged on the left side surfaces of the engine 20 and the transmission device 28. A transmission case assembly 3 forming the outer shape of the V-belt type continuously variable transmission 1 includes a transmission case body 31 and a transmission cover 32.

The transmission case body 31 is connected to an air intake duct 7 and an exhaust duct 8. Then, cooling air is supplied through the air intake duct 7 to the inside of the transmission case assembly 3 and then the air is discharged from the transmission case assembly 3 through the exhaust duct 8 to the outside. The air intake duct 7 leads from an intake port 7a located in the rightward of the engine 20, through a bent part 7b bypassing the engine 20 around the rear part, to the transmission case body 31. The exhaust duct 8 extends upward from the rear end part of the transmission case body 31 and then is bent. Then, an exhaust port 8a is opened in the upper part of the transmission device 28.

Figure 3:
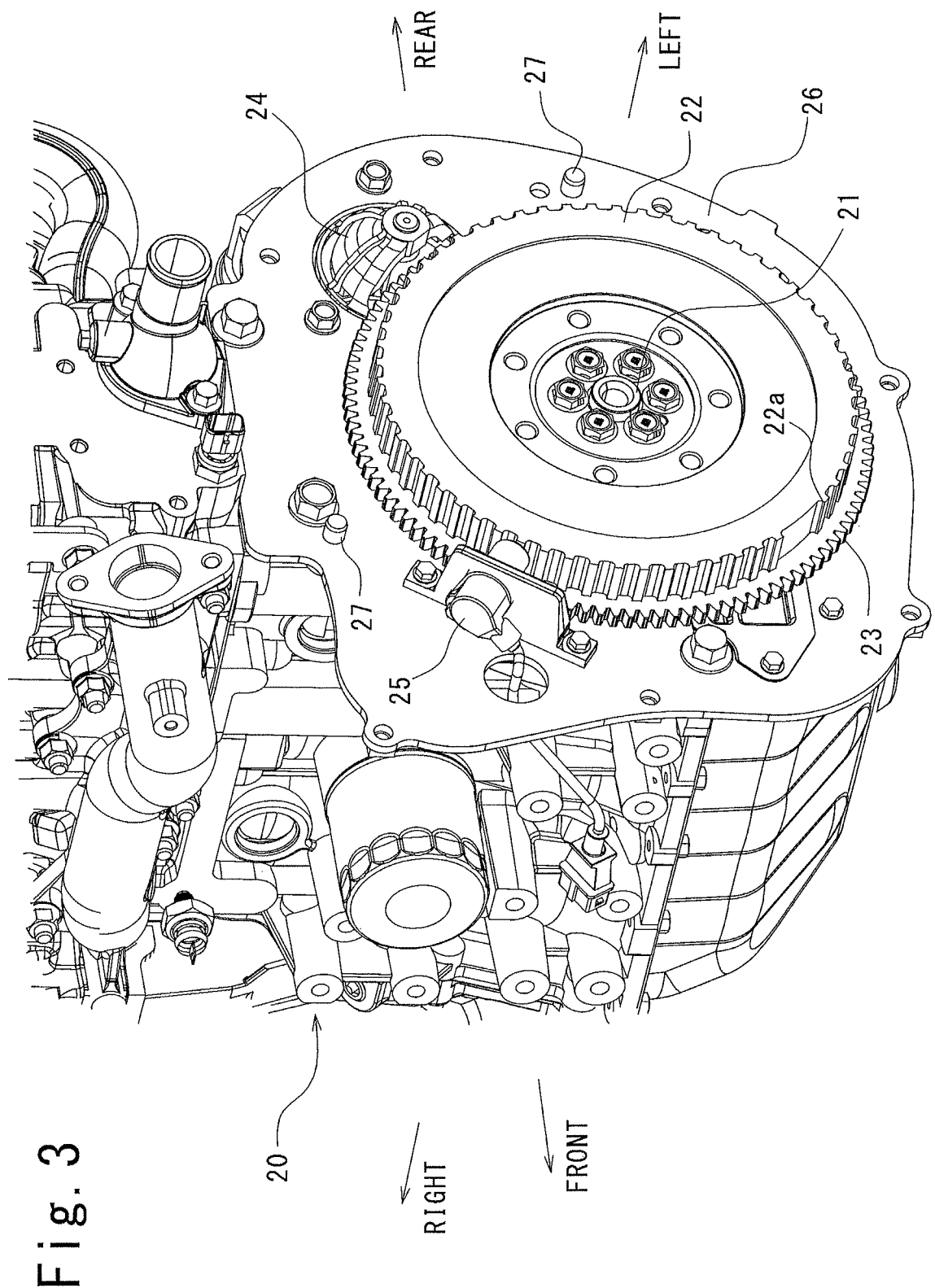
FIG. 3 is a perspective view of an engine, where the vicinity of a flywheel is enlarged.

FIG. 3 is a perspective view of the engine 20 viewed from an obliquely forward left side. An attachment plate 26 used for attaching the V-belt type continuously variable transmission 1 (see FIG. 2) is attached to the left side surface of the engine 20. The crankshaft 2l passes through the attachment plate 26 and extends leftward. Then, a flywheel 22 is attached to the left end part of the crankshaft 21. The flywheel 22 includes: an outer periphery gear 22a formed in an integrated manner in the outer periphery; and a ring gear 23 fixed in the rightward of the outer periphery gear 22a.

A starter 24, a crank angle sensor 25, and a pair of dowel pins 27 are attached to the attachment plate 26. When electricity is supplied, the starter 24 revolves the ring gear 23 and thereby revolves the crankshaft 21 with the flywheel 22 in between. By virtue of this, the engine 20 is started. The crank angle sensor 25 detects the outer periphery gear 22a of the flywheel 22 so as to detect the angle of rotation of the crankshaft 21 and is used for operation control of the engine 20. The dowel pins 27 are used for positioning of the V-belt type continuously variable transmission 1 (see FIG. 2).

Figure 4:
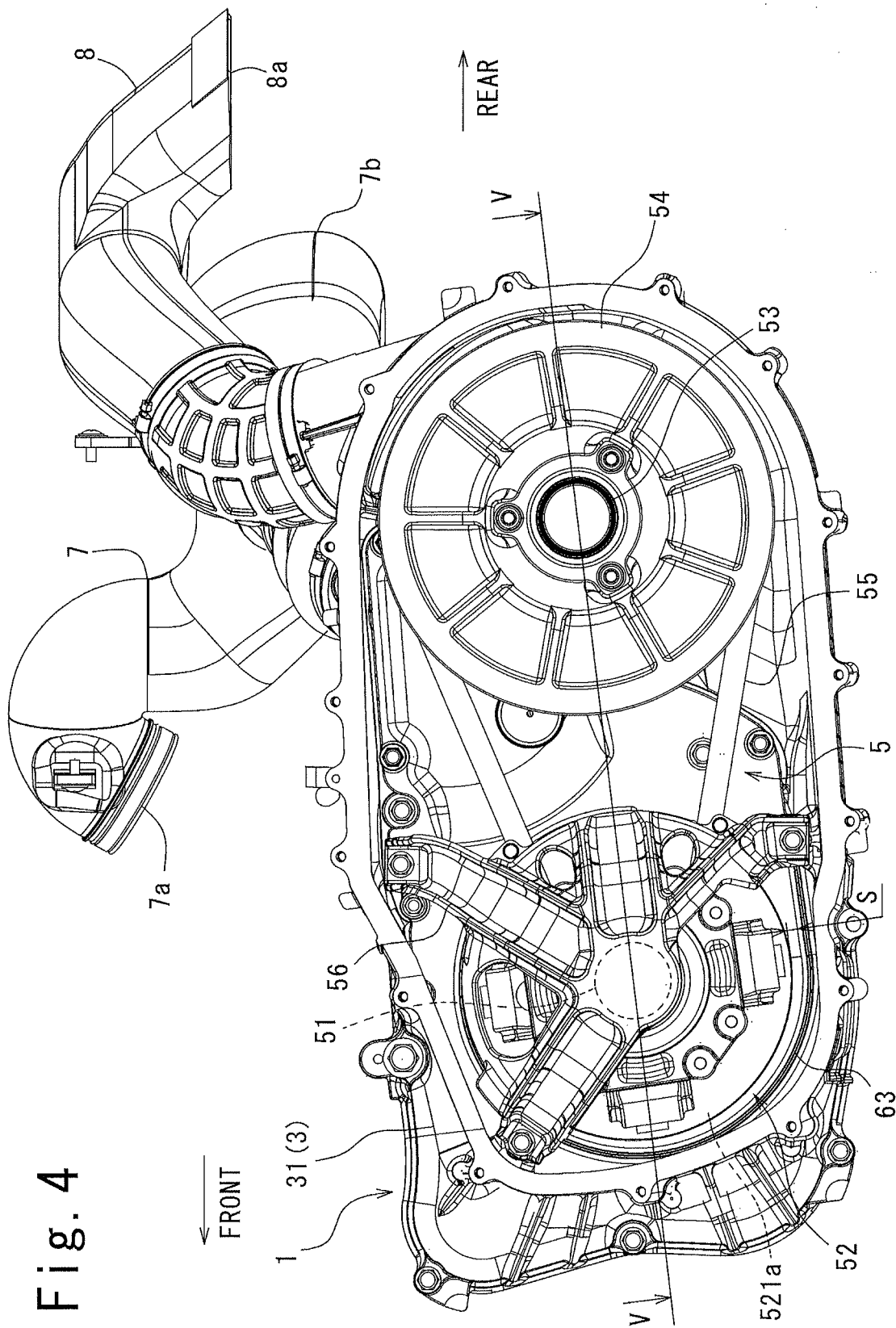
FIG. 4 is a left side view of a V-belt type continuously variable transmission.

(V-belt type continuously variable transmission 1) FIG. 4 is a left side view of the V-belt type continuously variable transmission 1, showing the inside of the transmission case assembly 3 in a situation in which the transmission cover 32 (see FIG. 2) is removed. The inside of the transmission case assembly 3 accommodates a transmission mechanism 5 constructed from: a drive shaft 51; a drive pulley 52 arranged on the drive shaft 51; a driven shaft 53; a driven pulley 54 arranged on the driven shaft 53; a V-belt 55 wound around both pulleys 52 and 54; a holder 56 for supporting the left end part of the drive shaft 51; and the like.

Figure 5:
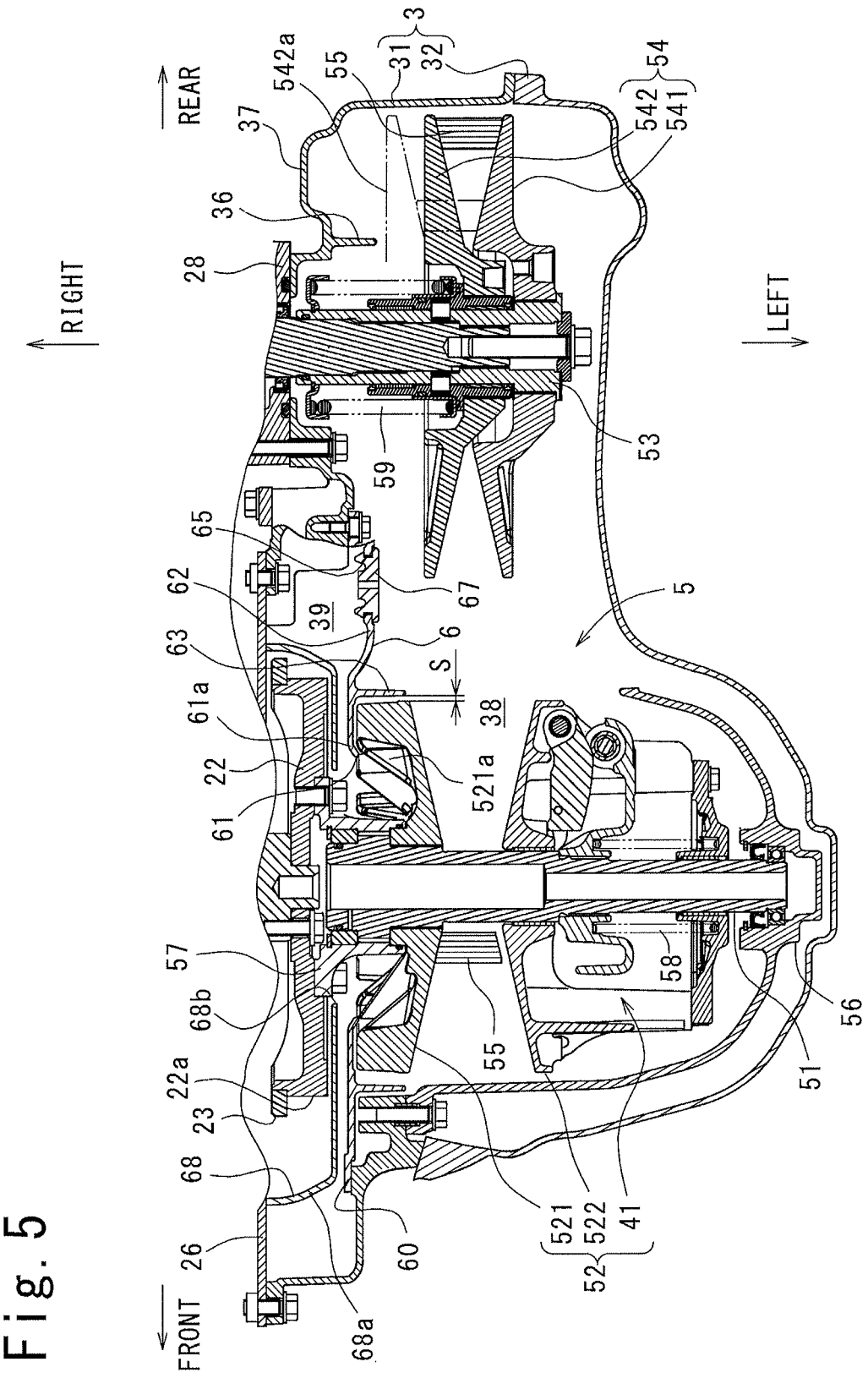
FIG. 5 is a sectional view taken along line V-V in FIG. 4, showing the inside of a V-belt type continuously variable transmission.

FIG. 5 shows a cross section taken along line V-V in FIG. 4 and is a sectional view taken along a line passing the drive shaft 51 and the driven shaft 53. In the inside of the transmission case assembly 3, a partition plate 6 is arranged for partitioning the inside of the transmission case assembly 3 into a left and a right part. Between the partition plate 6 and the transmission covers 32, a transmission chamber 38 is formed for accommodating the transmission mechanisms. Further, an air intake chamber 39 is formed between the partition plate 6 and the attachment plate 26.

(Drive Pulley 52)
As shown in FIG. 5, in the drive shaft 51, the right end part is connected to the flywheel 22 with a coupling 57 in between and the left end part is supported by the holder 56 with a bearing in between. The drive pulley 52 is constructed from: a fixed sheave 521 fixed to the drive shaft 51 non-movably in the drive shaft direction; a movable sheave 522 fit onto the drive shaft 51 movably in the drive shaft direction; a sheave thrust generation mechanism 41 of flyweight type; and the like.

The rear face (the right side surface) of the fixed sheave 521 is provided with a cooling fin 521a extending approximately radially from the shaft axis of the drive shaft 51. In association with revolution of the fixed sheave 521, cooling air in the air intake chamber 39 is discharged from the inner side of the radial direction to the outer side of the radial direction by the cooling fin 521a and then supplied to the transmission chamber 38. That is, the cooling fin 521a is constructed as a so-called centrifugal fan.

The movable sheave 522 is opposite to the fixed sheave 521 from the left side of the drive shaft direction and biased leftward by a pressure adjustment spring 58. As known in the present technical field, the sheave thrust generation mechanism 41 is constructed so as to press the movable sheave 522 rightward in association with a rise in the revolution speed of the drive shaft 51. That is, when the drive shaft 51 is stopping or at a low revolution speed, the movable sheave 522 is separated from the V-belt 55 and located in the leftward. However, in association with a rise in the revolution speed of the drive shaft 51, the movable sheave 522 is moved rightward by the sheave thrust generation mechanism 41 so as to pinch the V-belt 55 from right and left in cooperation with the fixed sheave 521.

(Driven Pulley 54)
The driven shaft 53 is formed in an integrated manner with a transmission input shaft of the transmission device 28. The driven pulley 54 is constructed from: a fixed sheave 541 fixed to the driven shaft 53 non-movably in the driven shaft direction; a movable sheave 542 fit onto the driven shaft 53 in a spirally movably in the driven shaft direction; and the like.

The movable sheave 542 is opposite to the fixed sheave 541 from the right side of the driven shaft direction and biased leftward by a pressure adjustment spring 59 so that the V-belt 55 is pinched from right and left by compression surfaces of conical shapes formed in both sheaves 541 and 542. That is, when the tension of the V-belt 55 is low, the movable sheave 542 is located in the leftward at a low position that the belt winding radius of the driven pulley 54 is maintained to be large. On the other hand, when the tension of the V-belt 55 increases, the movable sheave 542 moves to a position 542a in the rightward indicated by a dashed line in FIG. 5, in a manner of being gradually twisted relative to the fixed sheave 541. This position is a high position at which the belt winding radius of the driven pulley 54 is reduced.

Figure 6:
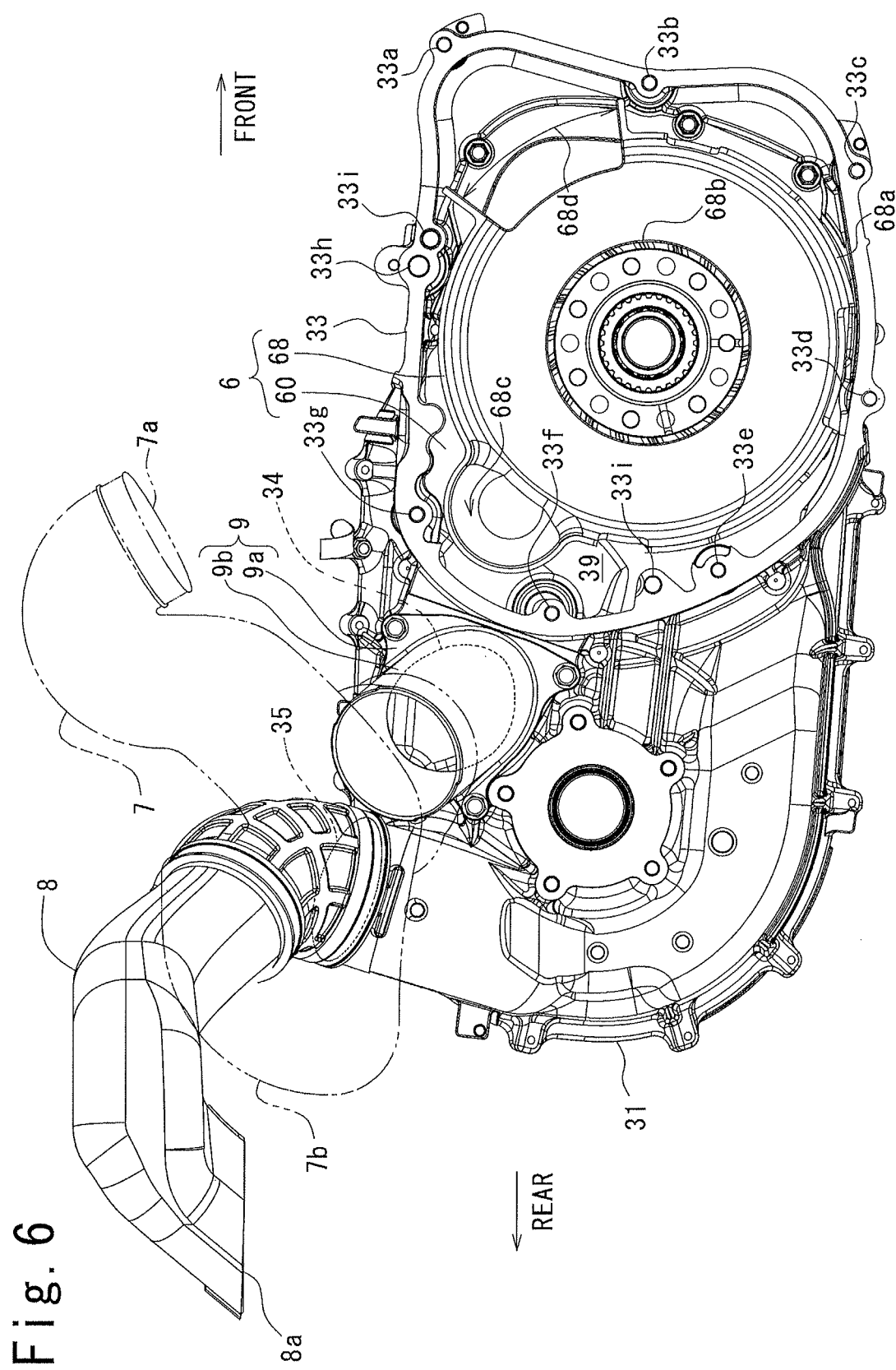
FIG. 6 is a right side view of aV-belt type continuously variable transmission.

(Transmission Case Assembly 3)
FIG. 6 is a right side view of the V-belt type continuously variable transmission 1, where the air intake duct 7 is made transparent and indicated by a dashed line. The transmission case body 31 includes: an attachment flange 33 formed in an approximately frontward half part; an inlet opening 34 formed in a somewhat rearward part relative to the center part in forward and backward directions; and an outlet opening 35 formed in the rear part. The transmission case body 31 is positioned when a pair of dowel pin holes 33i are fit onto the pair of the dowel pins 27 (see FIG. 3) of the attachment plate 26. Then, the transmission case body 31 is attached to the attachment plate 26 (see FIG. 3) by using attachment holes 33a to 33h.

The inlet opening 34 is opened rightward in fluid communication with the air intake chamber 39 and connected to one end part of the air intake duct 7 with an air intake fitting 9 in between. The outlet opening 35 is opened approximately upward and the tip part is connected to one end part of the exhaust duct 8.

The air intake fitting 9 is constructed from: a base 9a attached to the transmission case body 31; and an air intake duct connection port 9b connected to the air intake duct 7. The air intake duct connection port 9b extends obliquely rear upward in the side view shown in FIG. 6, then extends obliquely rear rightward in the top view shown in FIG. 2, and then is inclined relative to the base 9a. That is, the air intake duct connection port 9b is inclined relative to the base 9a so as to be oriented to the bent part 7b of the air intake duct 7. Here, the air intake fitting 9 may not be constituted of a separate member and may be formed in an integrated manner with the transmission case body 31.

Figure 7:
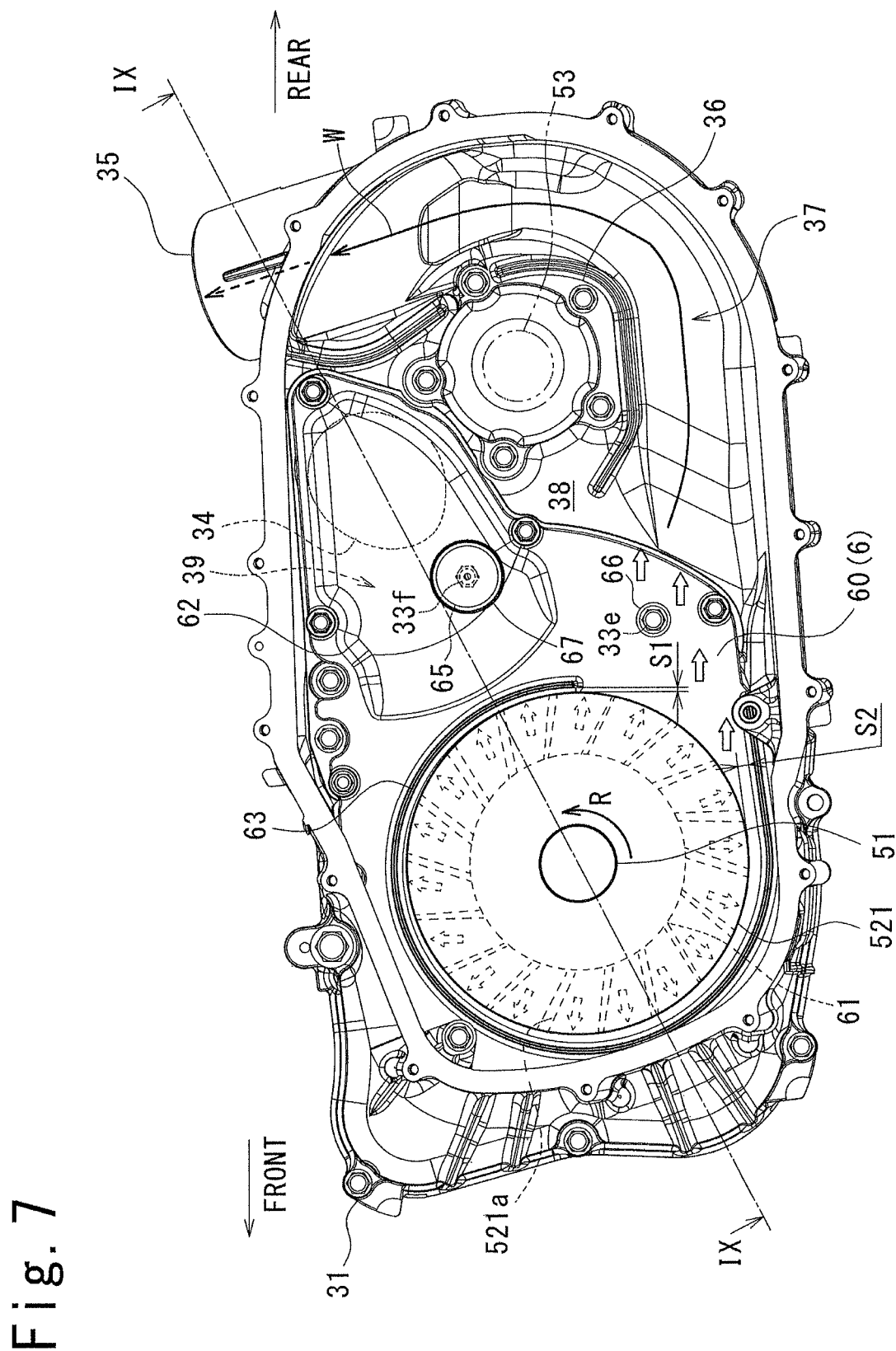
FIG. 7 is a left side view showing a state that a partition plate is attached to a transmission case.

FIG. 7 is a left side view showing a situation in which the partition plate 6 is attached to the transmission case body 31 and then the drive shaft 51 and the fixed sheave 521 on the drive shaft 51 side are further attached, where the driven shaft 53 is indicated by a dashed line. In the transmission case body 31, an outlet-side rib 36 is stood and formed in a counterclockwise manner from the lower part to the outlet opening 35 in the surroundings of the driven shaft 53. In the outer periphery of the outlet-side rib 36, an exhaust passage W is formed for guiding the cooling air to the outlet opening 35. In the transmission case body 31 defining the right end part of the exhaust passage W, an outlet-side recess 37 is recessed rightward.

(Partition Plate 6)

Figure 8:
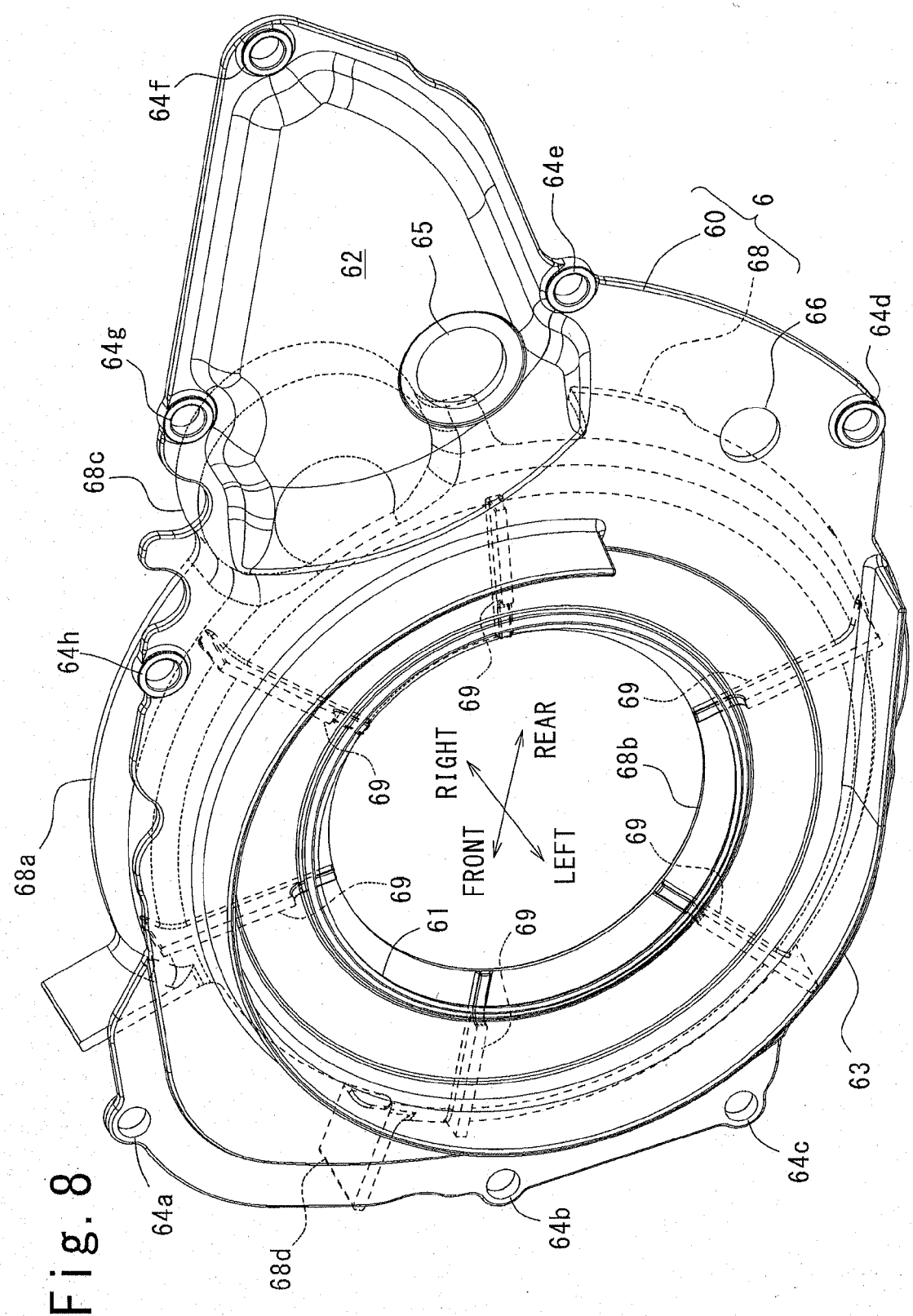
FIG. 8 is a perspective view of a partition plate.

FIG. 8 is a perspective view of the partition plate 6. The partition plate 6 includes: a partition plate body 60; and a flywheel cover 68 arranged in the rightward of the partition plate body 60 with a predetermined gap in between. The partition plate body 60 and the flywheel cover 68 are made from resin and connected to each other at a joining part 69 by vibration welding.

In the partition plate body 60, an air inlet part 61 going through right and left sides is provided in an approximately center part. Further, an inlet-side recess 62 is recessed leftward at the rearward part, and a casing 63 (a guide plate) protruding leftward is provided in the outer periphery of the air inlet part 61.

In the periphery of the partition plate body 60, eight attachment holes 64a to 64h are provided. Then, the partition plate 6 is attached to the transmission case body 31 (see FIG. 5) by using the attachment holes 64a to 64h. Here, in the attachment holes 64a to 64c on the front side, bolts are attached from the right side. Further, in the attachment holes 64d to 64h on the rear side, bolts are attached from the left side.

As shown in FIG. 5, the air inlet part 61 is formed so as to surround the drive shaft 51 and establish fluid communication between the air intake chamber 39 and the transmission chamber 38. Further, in the inner peripheral edge, a bent part 61a is formed so as to be bent along the cooling fin 521a. The bent part 61a permits smooth supply of cooling air from the air intake chamber 39 to the cooling fin 521a.

As shown in FIG. 7, the inlet-side recess 62 is formed approximately over a range opposite to the inlet opening 34 of the transmission case body 31. The casing 63 is stood over a range of approximately 270 degrees from the rear part of the air inlet part 61 to the lower part in a counterclockwise direction. The gap in the radial direction between the casing 63 and the fixed sheave 521 gradually increases from the rear part S1 to the lower part S2 along the rotation direction R of the fixed sheave 521. This improves the operation of discharging cooling air to the transmission chamber 38 performed by the cooling fin 521a.

Meanwhile, as described above, in the partition plate 6, the attachment holes 64a to 64c on the front side are for attachment from the air intake chamber 39 side. Thus, before the transmission case body 31 is attached to the attachment plate 26, the partition plate 6 need be attached in advance to the transmission case body 31. As a result, when the transmission case body 31 is to be attached to the attachment plate 26, the partition plate body 60 interrupts and causes difficulty in accessing (bolt tightening) from the transmission chamber 38 side to the attachment holes 33f and 33e. Thus, in the partition plate body 60, openings 65 and 66 are formed at positions corresponding to the attachment holes 33f and 33e so that the attachment holes 33f and 33e can be accessed through the openings 65 and 66 even in a state in which the partition plate 6 has been attached.

Here, the opening 65 is provided on the inlet-side recess 62. Thus, the transmission chamber 38 and the air intake chamber 39 are in fluid communication with each other through the opening 65. Then, after the transmission case body 31 is attached to the attachment plate 26, the opening 65 is closed with a grommet 67. Thus, the fluid communication between the air intake chamber 39 and the transmission chamber 38 is stopped so that a return of cooling air from the transmission chamber 38 to the air intake chamber 39 is avoided. Here, the opening 66 is not in fluid communication with the air intake chamber 39, and hence need not be closed.

As shown in FIG. 8, the flywheel cover 68 includes: a flywheel cover body 68a of approximate cup shape opened rightward; an opening 68b opened in the center part; a starter cover 68c provided in the upper rearward part; and a notch 68d for sensor formed in the upper front part. Then, the flywheel cover 68 is formed in the shape of a smoothly curved surface.

As shown in FIG. 5, the flywheel cover body 68a is formed so as to cover the periphery (i.e., the outer periphery gear 22a and the ring gear 23) of the flywheel 22. The opening 68b is provided so as to surround the coupling 57. With reference to FIGS. 3 and 6, the starter cover 68c is formed so as to cover the starter 24 protruding into the air intake chamber 39. Further, the notch 68d for sensor is provided at a position corresponding to the crank angle sensor 25.

(Operation)

Figure 9:
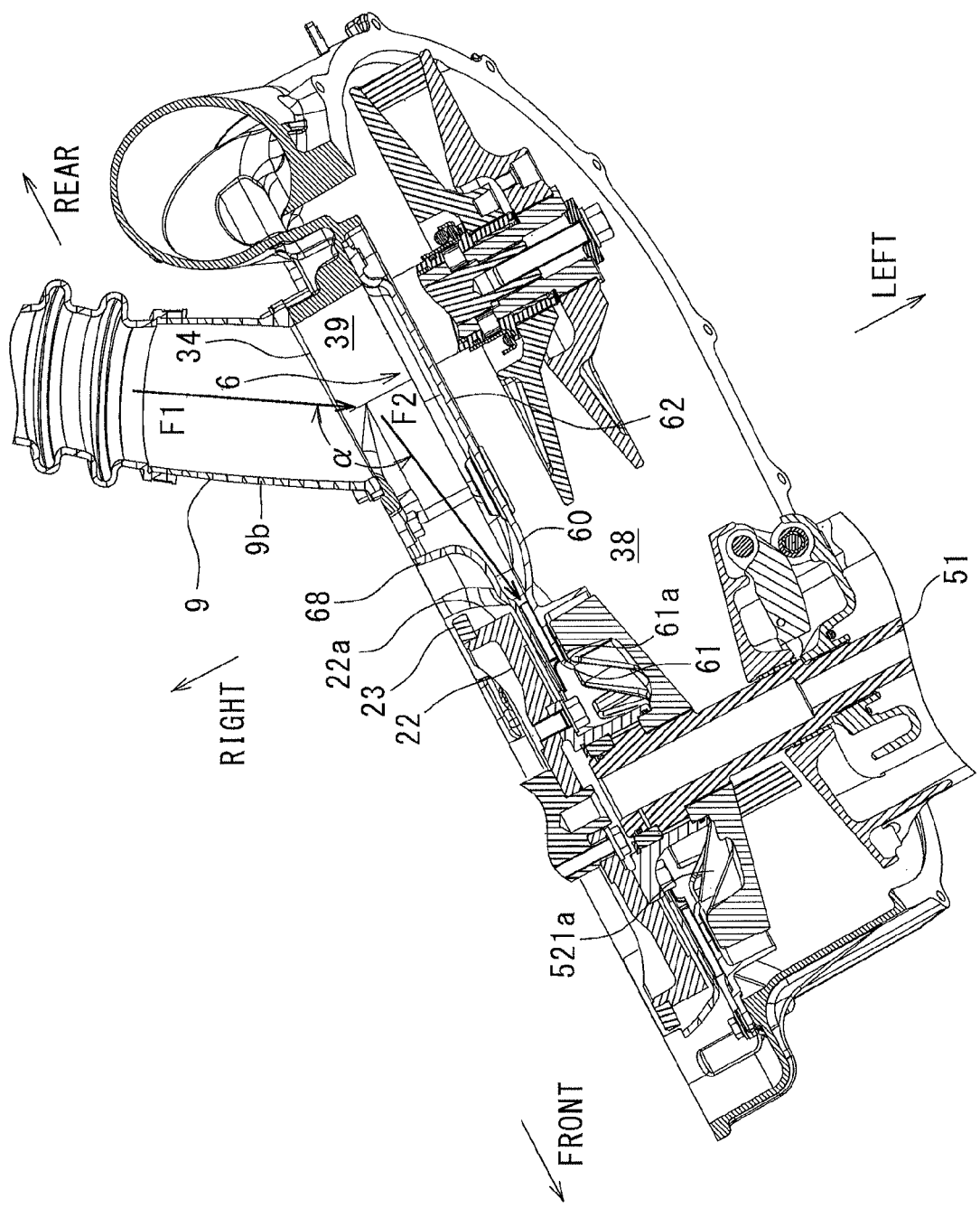
FIG. 9 is a sectional view taken along line IX-IX in FIG. 7, showing an air intake passage.

FIG. 9 is a cross section taken along line IX-IX in FIG. 7 and shows a passage for cooling air from the air intake fitting 9 to the cooling fin 521a. The air intake duct connection port 9b of the air intake fitting 9 is inclined toward the bent part 7b (see FIG. 2) in the rear. Thus, the angle α formed between the flow F1 of the cooling air in the air intake fitting 9 and the flow F2 of the cooling air leading from the inlet opening 34 to the cooling fin 521a in the front can be constructed moderately. This restrains a rise in the air intake pressure loss in the joining part between the flow F1 and the flow F2 so that a smooth flow of the cooling air from the air intake fitting 9 into the air intake chamber 39 is achieved.

Further, in the partition plate 6 defining the air intake chamber 39 and the transmission chamber 38, the inlet-side recess 62 is formed in a region opposite to the inlet opening 34. Thus, the volume of the air intake chamber 39 in the joining part with the air intake fitting 9 is enlarged. This restrains further a rise in the air intake pressure loss in the joining part.

The cooling air supplied to the air intake chamber 39 goes through a space between the partition plate body 60 and the flywheel cover 68 and then reaches the air inlet part 61. The flywheel 22 is located in the air intake chamber 39. However, since the flywheel cover 68 restrains the discharging operation in the circumferential direction caused by the flywheel 22, the cooling air can be supplied to the air inlet part 61.

Further, the cooling air can be supplied to the air inlet part 61 from approximately entire circumferential directions of the circumference of the drive shaft 51 between the partition plate body 60 and the flywheel cover 68. Thus, the volume of the passage for the cooling air is ensured sufficiently. Further, in the inner edge of the air inlet part 61, the bent part 61a is formed along the cooling fin 521a. Thus, the connection part from the air inlet part 61 to the cooling fin 521a is guided smoothly. This permits sufficient supply of cooling air from the air intake chamber 39 to the cooling fin 521a.

As shown in FIG. 7, in association with revolution of the drive shaft 51 connected to the crankshaft 21 with the flywheel 22 in between, the cooling air supplied to the air inlet part 61 is discharged outward in the radial direction by the cooling fin 521a. Then, since the partition plate body 60 is provided with the casing 63 surrounding the cooling fin 521a, the cooling air discharged by the cooling fin 521a goes around the drive pulley 52 and then is guided to the driven shaft 53 side.

The cooling air guided to the driven shaft 53 side is guided by the outlet-side rib 36 so as to go around the surroundings of the driven shaft 53 and then is discharged through the outlet opening 35 to the exhaust duct 8 (see FIG. 2). At that time, a return of the cooling air in the surroundings of the driven shaft 53 toward the drive shaft 51 side is avoided by the outlet-side rib 36 and hence the cooling air is smoothly discharged through the outlet opening 35.

Further, in the transmission case body 31, the outlet-side recess 37 is formed in the right side wall defining the exhaust passage W. Thus, even in the high state in which the belt winding radius of the driven pulley 54 is reduced, the movable sheave 542a that has moved to the right side avoids excessive reduction of the exhaust passage and hence ensures the passage area of the exhaust passage W. This ensures a discharging property for the cooling air from the transmission case assembly 3.

According to the V-belt type continuously variable transmission 1 having the above-mentioned configuration, the following effects are obtained.

(1) Since the air intake duct connection port 9b is provided in the side wall on the engine side of the transmission case body 31, the air intake duct 7 extending from the air intake port 7a arranged on the engine side to the air intake duct connection port 9b can be compactly arranged in a short distance. Further, since the air intake duct connection port 9b is inclined, the air intake passage leading from the air intake duct 7 to the transmission case body 31 can be connected in an inclined manner relative to the transmission case body 31. This restrains a rise in the air intake pressure loss in the connection part.

(2) The air intake passage in the air intake duct connection port 9b can be connected at an obtuse angle to the air intake passage leading from the inlet opening 34 to the drive shaft 51. Thus, the air intake passage leading from the air intake duct connection port 9b to the transmission case body 31 can be constructed so as to be gradual. This restrains a rise in the air intake pressure loss in the connection part.

(3) In the downstream of the bent part 7b, the air intake duct 7 can be connected to the air intake duct connection port 9b in an approximately straight line alignment. Thus, the air intake passage leading from the air intake duct 7 in the downstream of the bent part 7b to the air intake duct connection port 9b can be constructed in an approximately straight line alignment. This restrains a rise in the air intake pressure loss in the connection part. Further, when the air intake duct 7 is arranged in an approximately straight line alignment, the air intake duct 7 is constructed in a short distance. This permits size reduction in the air intake duct 7 and improves the assembly workability.

(4) With bypassing the engine 20 from the rear part, the air intake duct 7 can be compactly arranged and connected to the air intake duct connection port 9b.

(5) Heat release from the transmission chamber 38 to the air intake chamber 39 is restrained by the partition plate 6 made from resin having a low thermal conductivity. This restrains a temperature rise in the cooling air in the air intake chamber 39.

(6) The air intake passage opposite to the inlet opening 34, that is, the passage in the connection part from the air intake duct connection port 9b to the air intake chamber 39 can be expanded. This restrains a rise in the air intake pressure loss in the connection part.

(7) When the outlet-side recess 37 is provided, the exhaust passage W can be expanded. In particular, even when the driven pulley 54 constructed movably on the driven shaft 53 is located close to the inner wall surface of the transmission case body 31, excessive reduction of the exhaust passage W by the driven pulley 54 is restrained. This ensures a discharging property for the cooling air that has passed through the transmission chamber 38.

(8) A situation in which the cooling air that has passed through the transmission chamber 38 returns from the exhaust passage W to the transmission chamber 38 is restrained by the outlet-side rib 36. Thus, the cooling air that has passed through the transmission chamber 38 can easily be guided to the outlet opening 35. This ensures a discharging property for the cooling air that has passed through the transmission chamber 38.

Various modifications and changes may be made without departing from the spirit and the scope of the present invention described in the claims.

What is claimed is:

1. A V-belt type continuously variable transmission provided with a transmission case attached to an engine and forming an outer shape, comprising:
    an air intake duct having a first end configured as an air intake port and a second end connected to the transmission case, the first end being positioned at an opposite side of the engine than the transmission case;
    an air intake duct connection port having a proximal end connected to a side wall of the transmission case, the side wall of the transmission case facing the engine, and a distal end connected to the air intake duct; and
    a transmission mechanism accommodated within the transmission case and including a drive shaft connected to the engine and provided with a drive pulley, a driven shaft provided with a driven pulley and a V-belt wound around between the drive pulley and the driven pulley,
    wherein the air intake duct connection port is positioned between the drive shaft and the driven shaft in a vehicle longitudinal direction and is inclined relative to the side wall of the transmission case such that the proximal end of the air intake duct connection port is closer to a central axis of the drive shaft than the distal end of the air intake duct connection port,
    wherein the air intake duct extends from the air intake port through a bent part to the air intake duct connection port, the bent part being arranged so as to bypass the engine from a rear side of the engine such that the bent part is further away from the engine in the vehicle longitudinal direction than both the air intake port and the air intake duct connection port, and
    wherein the air intake duct connection port is directed to the bent part.

2. The V-belt type continuously variable transmission according to claim 1, wherein
    the transmission case is provided with an inlet opening which is in fluid communication with the air intake duct connection port, and
    wherein the air intake duct connection port is inclined and directed to a direction extending from the inlet opening to the drive shaft.

3. The V-belt type continuously variable transmission according to claim 2, comprising
    a partition plate for partitioning the transmission case into a transmission chamber for accommodating the transmission mechanism and into an air intake chamber extending from the inlet opening to the drive shaft,
    wherein the partition plate is made from resin.

4. The V-belt type continuously variable transmission according to claim 3, wherein a region of the partition plate approximately opposite to the inlet opening is provided with an inlet-side recess recessed toward a transmission chamber side.

5. The V-belt type continuously variable transmission according to claim 3, further comprising
an exhaust passage for discharging cooling air that has passed through the transmission chamber, to an outside of the transmission case via an outlet opening provided in the transmission case,
wherein the exhaust passage is defined as a region extending from surroundings of the driven shaft to the outlet opening and is located between an inner wall surface of the transmission case and the driven pulley, and
wherein a region of the inner wall surface opposite to the driven pulley is provided with an outlet-side recess recessed toward the outside of the transmission case.

6. The V-belt type continuously variable transmission according to claim 5, wherein
in the transmission case, an outlet-side rib for separating the exhaust passage and the transmission chamber from each other is provided so as to protrude toward the driven pulley.

7. The V-belt type continuously variable transmission according to claim 1, wherein
the V-belt type continuously variable transmission is mounted on a vehicle, and
wherein the air intake duct connection port is inclined in a rearward direction of the vehicle.

8. A V-belt type continuously variable transmission connected to a first side of an engine, comprising:
a transmission case forming an outer shape of the transmission;
an air intake fitting attached to a wall of the transmission case and configured to take a cooling air in the transmission case, the wall of the transmission case facing the engine;
an air intake duct having a first end positioned at a second side of the engine opposite to the first side and configured as an air intake port, and a second end connected to the air intake fitting; and
a transmission mechanism accommodated within the transmission case and including a drive shaft and a driven shaft disposed behind the drive shaft,
wherein the air intake fitting has a base attached to the wall of the transmission case and an air intake duct connection port extending from the base in a direction away from the transmission case and connected to the air intake duct,
wherein the base is positioned between the drive shaft and the driven shaft in a vehicle longitudinal direction,
wherein the air intake duct connection port is inclined relative to the base so as to extend obliquely away from the transmission case,
wherein the air intake duct extends from the air intake port through a bent part to the air intake duct connection port, the bent part being arranged so as to bypass the engine from a rear side of the engine such that the bent part is further away from the engine in the vehicle longitudinal direction than both the air intake port and the air intake duct connection port, and
wherein the air intake duct connection port is directed to the bent part.

* * * * *